(12) United States Patent
Brugger et al.

(10) Patent No.: US 6,960,034 B2
(45) Date of Patent: Nov. 1, 2005

(54) DEVICE FOR ACTUATING THE FLAP OF OPTICAL WAVEGUIDE SPLICERS

(75) Inventors: Rudolf Brugger, Puchheim (DE); Dieter Krause, Uffing am Staffelsee (DE)

(73) Assignee: Siemens Aktiengesellschaft, Munich (DE)

( * ) Notice: Subject to any disclaimer, the term of this patent is extended or adjusted under 35 U.S.C. 154(b) by 369 days.

(21) Appl. No.: 10/240,850

(22) PCT Filed: Mar. 27, 2001

(86) PCT No.: PCT/DE01/01172

§ 371 (c)(1),
(2), (4) Date: Oct. 4, 2002

(87) PCT Pub. No.: WO01/77728

PCT Pub. Date: Oct. 18, 2001

(65) Prior Publication Data

US 2003/0091305 A1 May 15, 2003

(30) Foreign Application Priority Data

Apr. 5, 2000 (DE) .......................... 100 17 008

(51) Int. Cl.⁷ .............................................. G02B 6/255
(52) U.S. Cl. ........................................ 385/95; 385/135
(58) Field of Search ...................... 385/95–99, 135–137; 156/502, 157–158, 296, 304

(56) References Cited

U.S. PATENT DOCUMENTS

| 3,919,037 | A | * | 11/1975 | Miller .......................... 156/502 |
| 4,276,113 | A | * | 6/1981 | Carlsen et al. .............. 156/502 |
| 4,784,456 | A | * | 11/1988 | Smith ........................... 385/55 |
| 5,170,456 | A | | 12/1992 | Itoh et al. ...................... 385/96 |
| 5,546,491 | A | | 8/1996 | Loch ............................. 385/99 |
| 5,553,186 | A | * | 9/1996 | Allen .......................... 385/135 |
| 5,586,211 | A | * | 12/1996 | Dumitrou et al. .......... 385/135 |
| 5,754,723 | A | * | 5/1998 | Fremgen ..................... 385/135 |
| 5,963,699 | A | * | 10/1999 | Tanaka et al. ................ 385/97 |
| 5,984,532 | A | * | 11/1999 | Tamaki et al. ............... 385/70 |
| 6,034,718 | A | * | 3/2000 | Hattori ......................... 348/61 |
| 6,134,371 | A | * | 10/2000 | Yoshida et al. ............. 385/137 |
| 6,377,743 | B1 | * | 4/2002 | Ueda et al. ................. 385/137 |
| 6,483,979 | B1 | * | 11/2002 | DeMartino et al. ......... 385/137 |
| 6,764,230 | B1 | * | 7/2004 | Karacsony et al. ........... 385/98 |
| 6,814,124 | B2 | * | 11/2004 | Esmaeili ..................... 156/502 |

FOREIGN PATENT DOCUMENTS

| DE | 4006799 | 9/1991 |
| WO | 9605528 | 2/1996 |

* cited by examiner

Primary Examiner—Diane I. Lee
Assistant Examiner—Kumiko C. Koyama
(74) Attorney, Agent, or Firm—Harness, Dickey & Pierce, P.L.C.

(57) ABSTRACT

A device is for actuating the flaps of an optical waveguide splicer. The device includes a wind protection flap that can be rotated around a first rotational axis between a closed state and an open state, a first holding flap that's is arranged underneath the wind protection flap on a side of a splicing location and can be swiveled around a second rotational axis between a closed state and an open state and a second holding flap that is arranged underneath the wind protection flap on the remaining side of the splicing location and can be swiveled around the second rotational axis. The wind protection flap is provided with a first coupling device via which the first holding flap and/or the second holding flap can be coupled to the movement of the wind protection flap from the closed state into the open state.

20 Claims, 3 Drawing Sheets

DEVICE FOR ACTUATING THE FLAP OF OPTICAL WAVEGUIDE SPLICERS

This application is the national phase under 35 U.S.C. § 371 of PCT International Application No. PCT/DE01/01172 which has an International filing date of Mar. 27, 2001, which designated the United States of America and which claims priority on German Patent Application number DE 100 17 008.0 filed Apr. 5, 2000, the entire contents of which are hereby incorporated herein by reference.

FIELD OF THE INVENTION

The present invention generally relates to a device for actuating a flap of an optical waveguide splicer.

BACKGROUND OF THE INVENTION

Microprocessor-controlled splicers are known which are used for producing mechanically firm, long-term stable and low-attenuation connections between optical waveguides. In this case, the ends of two fibers, which are aligned exactly with respect to one another, are welded by using an arc which is produced between two electrodes. The fiber positioning and the welding process are carried out automatically, thus ensuring equally good results irrespective of the operator.

Appliances such as these (see U.S. Pat. No. 6,002,827 A), which are generally portable, are used for welding optical waveguides in situ.

These splicers have various flaps for picking up and holding the optical waveguides on the splicer, and these flaps can be operated individually by the operator. In detail, these flaps have a right-hand LID (Local Injection and Detection) flap, a right-hand and a left-hand holding flap, and a wind protection flap. In order to insert a fiber, for example the right-hand fiber, this fiber is inserted into a right-hand fiber guide so that it projects toward the splicing location, and the right-hand holding flap is closed by rotating it about an axis. The right-hand fiber is then held firmly in the right-hand fiber guide. The right-hand LID flap is then closed, so that the right-hand fiber is held firmly in a groove under the right-hand LID flap. A corresponding procedure is carried out on the left-hand side. When the right-hand and left-hand holding flaps and the right-hand and left-hand LID flaps are closed, the wind protection flap is rotated above the right-hand and left-hand holding flaps, by rotating it about an axis. Further, it is closed, with the wind protection flap providing protection against the wind while working in situ, since such wind could move and interfere with the arc which is produced between two electrodes at the splicing location. The wind protection flap contains a lighting unit, with whose aid an image of the splicing location is produced and is displayed on a monitor. After the splicing process, the flaps are opened individually in order to remove the welded optical waveguide, and in order to insert new fibers.

SUMMARY OF THE INVENTION

An object of an embodiment of the present invention is to provide a device for flap operation in an optical waveguide splicer, by which flap operation can be considerably simplified.

An advantage of an embodiment of the present invention is that, when carrying out splicing operations, an operator can operate the flaps of a splicer, namely the right-hand and left-hand LID flaps, the right-hand and left-hand holding plates and the wind protection flap considerably more easily. That is to say, one can operate it with only a few actions, and more quickly than is the case with the known splicers.

This also takes account of the need to be able to open and close the flaps selectively, individually or at the same time. While, in known splicers, the flaps have to be opened and closed individually in a specific sequence, in the case of the device according to an embodiment of the invention, when the wind protection flap is opened, the right-hand and left-hand holding flaps and the right-hand and left-hand LID flaps are automatically operated at the same time, and are moved to the respective open state. From the open state, each flap of the right-hand and left-hand holding flaps can then be closed in order to fix a new right-hand or left-hand fiber in a fiber guide, after which each of the right-hand and left-hand LID flaps can be closed in order to hold the right-hand and left-hand fibers, respectively, in the groove which is located under the right-hand or left-hand LID flap, respectively, and in order to carry out an attenuation measurement. When the wind protection flap is subsequently closed before carrying out the splicing operation, the wind protection flap is once again automatically locked to the right-hand and left-hand holding flaps, in order to carry out the next opening operation.

BRIEF DESCRIPTION OF THE DRAWINGS

The invention and its refinement will be described in more detail in an exemplary format in the following text in conjunction with the figures, in which.

DETAILED DESCRIPTION OF THE PREFERRED EMBODIMENTS

Figure 1:
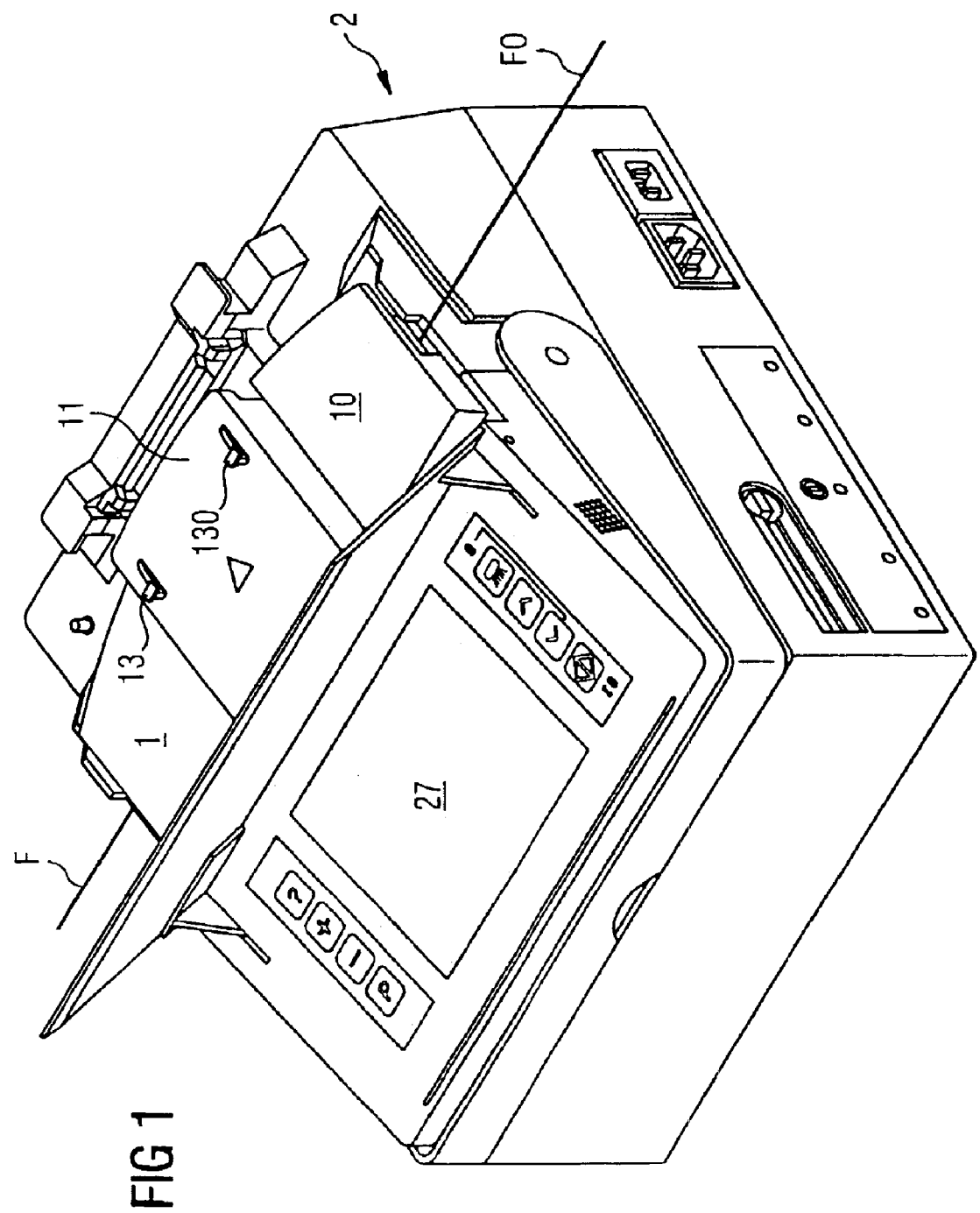
FIG. 1 shows the design of an existing splicer.

The splicer for optical waveguides with the present device for operation of the flaps is annotated 2 in FIG. 1. The splicer 2 is controlled fully electronically with regard to fiber positioning and the actual welding process, with the splicing location being displayed on a monitor 27. The flaps which are operated by the present device comprise a left-hand LID flap 1, a right-hand LID flap 10, a left-hand holding plate 5 and a right-hand holding plate 50, which cannot be seen in FIG. 1, and a wind protection flap 11. For splicing, the splicer 2 is supplied with a right-hand optical waveguide or a right-hand fiber F0, and with a left-hand optical waveguide or a left-hand fiber F.

Figure 2:
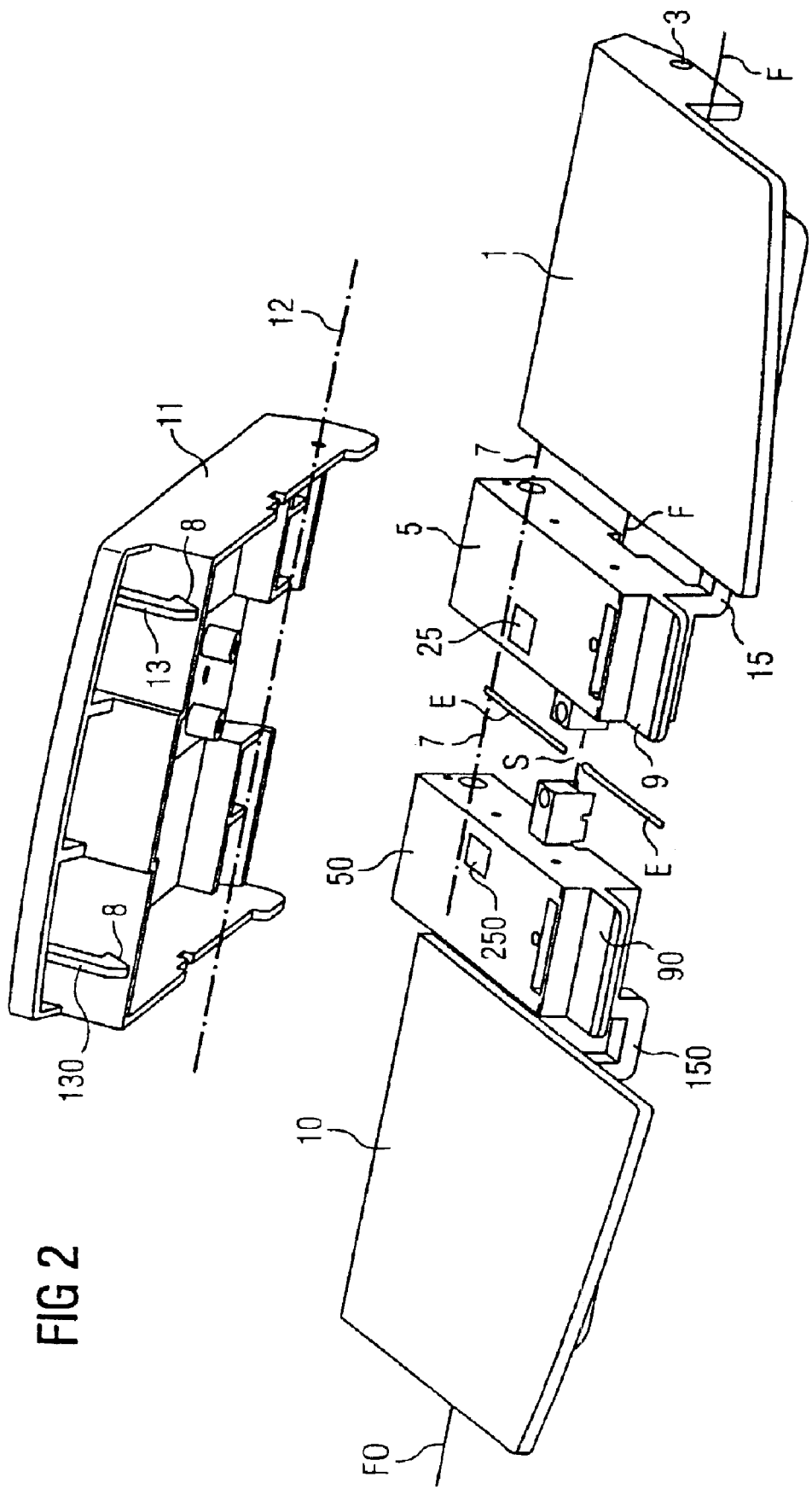
FIG. 2 uses a separate illustration to show the right-hand and left-hand holding flaps, the right-hand and left-hand LID flaps and the wind protection flap of the splicer as shown in FIG. 1, in order to explain the device according to an embodiment of the invention.

As shown in FIG. 2, which shows the arrangement of the individual abovementioned flaps, with the wind protection flap 11 being opened independently of the holding plates 5, 50 and the LID flaps 1, 10, the left-hand holding flap 5 and the left-hand LID flap 1 are arranged on one side of the splicing location S, and the right-hand holding flap 50 and the right-hand LID flap 10 are arranged on the other side of the splicing location S. The fiber ends are welded by use of an arc, which is produced at the splicing location S by electrodes E.

The holding flaps 5 and 50 can be pivoted on the splicer 2 about a common rotation axis 7 between the closed state, as illustrated in FIG. 2, and an open state, in which they are pivoted upward through an opening angle of about 95°. A fiber guide (not illustrated) is located underneath each holding plate 5, 50, in which the respective fiber F or F0 is held in V-shaped grooves which are open at the top, are spaced apart from one another in the direction parallel to the rotation axis 7, and are closed during closure of the holding flaps, in order to firmly clamp the respective fiber F or F0 via the respective holding flap 5 or 50, with the fiber ends projecting beyond the respective holding plate 5 or 50, toward the splicing location S.

The LID flaps 1 and 10, which are arranged on opposite sides of the splicing location S outside the respective holding plates 5 and 50, can pivot upward about a common rotation axis 3 from the closed state, as shown in FIG. 2, to an open state. A groove which runs parallel to the rotation axis 3 and into which the respective fibers F and F0 are inserted is located underneath each of the LID flaps 1 and 10, and is closed at the top when the LID flaps 1 and 10 are closed. The LID flaps are used for holding the fibers F, F0 during the measurement of the splice attenuation.

The wind protection flap 11 can pivot about a rotation axis 12, covering the holding plates 5 and 50 in the closed state, as shown in FIG. 1. The wind protection flap 11 has a lighting unit, which is not illustrated in any more detail but which, when the wind protection flap 11 is in the closed state, illuminates the splicing location S in order to produce a picture of the fiber ends on the monitor 27. The rotation axes 3, 7 and 12 run parallel to one another.

The holding flaps 5 and 50 each have a projecting latching-in part 9 or 90, respectively, preferably in the form of a plate, on the side facing away from the rotation axis 7, which latching-in part 9 or 90 can interact with respective hook parts 13 and 130, which are arranged on the side of the wind protection flap 11 facing away from the rotation axis at 12. The hook parts 13 and 130 are designed such that they spring open when the wind protection flap 11 is being closed and engage in a sprung manner behind the respective latching-in parts 9 and 90, so that, when the wind protection flap 11 is being closed, the holding flaps 5 and 50 are coupled to its movement. The hook parts 13, 130 preferably have guide inclines 8, which simplify the spring-open capability of the latching-in parts 9, 90.

Figure 3:
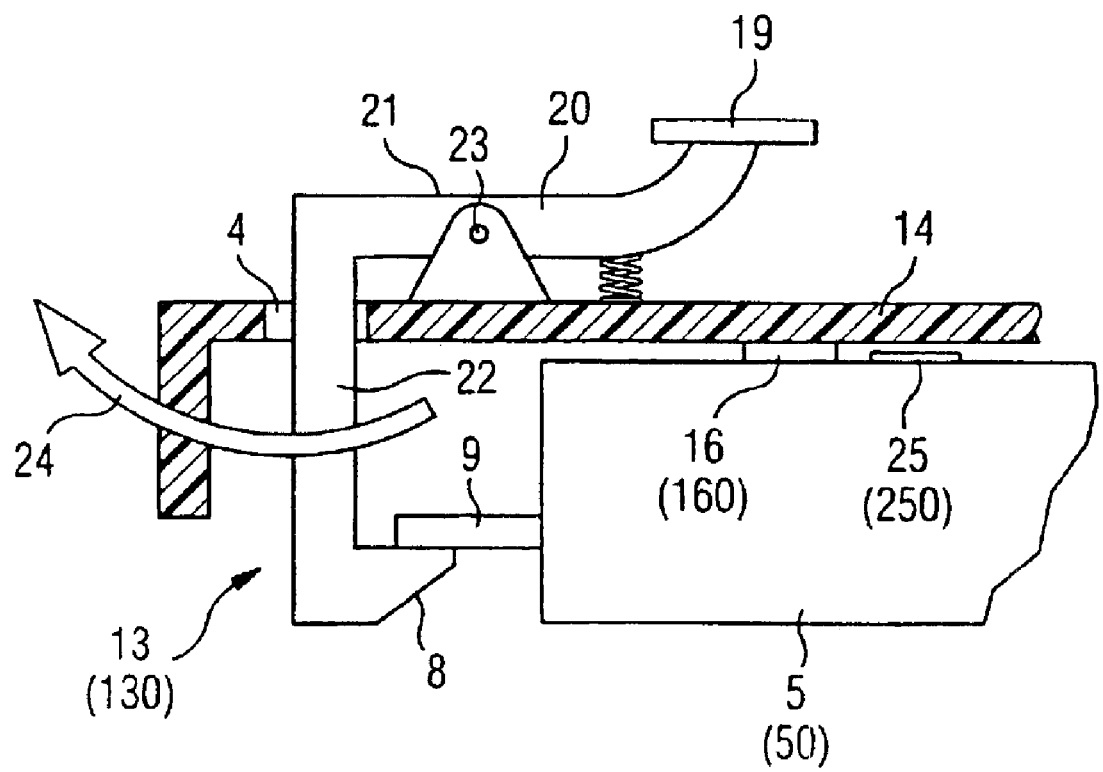
FIG. 3 shows, illustrated schematically, the design and the arrangement of a hook part on the wind protection flap.

FIG. 3 shows one advantageous refinement of the hook parts 13 and 130. According to this figure, each hook part 13, 130 has a hook element 22, which in the rest state runs downward at right angles to the upper wall 14 of the wind protection flap 11 through an opening 4 in the upper wall 14; and a hook element 20, which runs at right angles to the hook element 22 above the upper wall 14; has an operating button 19 on its side facing away from the hook element 22; and can pivot with respect to the upper wall 14 about a rotation point 23 in a bearing part 21 (arrow 24). The hook parts 13, 130 are each prestressed by use of a compression spring to the position shown in FIG. 3, in which they engage under the respective latching-in part 9 or 90.

On its side facing the respective LID flap 1 or 10, each holding flap 5, 50 has a respective driver part 15 or 150, preferably on the side facing away from the rotation axis 7, which extends under the edge region of the respective LID flap 1 or 10 facing the respective holding part 5 or 50, with the respective LID flap 1 or 10 resting on the respective driver part 15 or 150 in the closed state. The respective driver part 15 or 150 is preferably in the form of a finger part, which extends laterally from the respective holding flap 5 or 50.

Since, in the preferred embodiment, the rotation axis 12 of the wind protection flap 11 is arranged above the rotation axis 7 of the holding flaps 5 and 50, a relative movement takes place between the wind protection flap 11 and the holding flaps 5, 50 during opening of the wind protection flap 11 and of the holding flaps 5, 50 which are coupled to it. In the end, this leads to the hook parts 13 and 130 no longer engaging behind the respective latching-in parts 9 and 90. In order to achieve and to maintain a coupling between the wind protection flap 11 and the holding flaps 5, 50 despite this, each holding flap 5, 50 has a respective permanent magnet 25 or 250 on its side facing the wind protection flap 11. The permanent magnet 25 or 250 interacts with a respective sheet-metal part 16 or 160 which is provided on the inside of the wind protection flap 11 (see FIG. 3). During opening, this ensures that when, as a consequence of the relative movement that has been mentioned, the hook parts 13, 130 are moved sufficiently that they no longer engage behind the respective latching-in parts 9 and 90, the respective permanent magnet 25 or 250 is moved into the area of the respective sheet-metal part 16 or 160, thus ensuring the coupling between the wind protection flap 11 and the holding flaps 5, 50 by virtue of the attraction between the respective permanent magnet 25 or 250 and the respective sheet-metal part 16 or 160. Conversely, as a consequence of the relative movement, the respective sheet-metal parts 16 and 160 do not move out of the region of the respective permanent magnets 25 and 250 until the respective hook parts 13 and 130 once again engage behind the respective latching-in parts 9 and 90.

The operation of the present device for automatic operation of the flaps of the splicer 2 will be explained in more detail in the following text. In this case, first of all, it is assumed that a splicing operation has just been carried out and that, as shown in FIG. 1, the wind protection flap 11, the holding flaps 5, 50 and the LID flaps 1, 10 are closed. In order to remove the fibers F, F0 which have just been welded and in order to prepare for a subsequent welding operation, the wind protection shroud 11 is opened manually. During this process, owing to the locking of the hook parts 13, 130 on the respective latching-in parts 9 and 90, and owing to the attraction between the permanent magnets 25, 250 and the sheet-metal parts 16, 160, and owing to the contact between the LID flaps 1, 10 and the respective driver parts 15 and 150, the flaps 1, 5, 10 and 50 are also opened automatically, together with the wind protection flap 11. Once the welded fibers have been removed, new fibers F, F0 can then be inserted into the fiber guides underneath the holding flaps 5, 50. The wind protection flap 11 is closed in order to clamp these fibers F, F0 firmly, with the holding flaps 5, 50 also automatically being closed at the same time in order to clamp the fibers F, F0 firmly in the fiber guides, and with the hook parts 13, 130 engaging behind the latching-in parts 9, 90, such that they are locked. The LID flaps 1 and 10 remain open and are closed separately, in order to carry out the attenuation measurement, once the fibers F, F0 have been inserted into the grooves associated with the LID flaps 1, 10.

A new splicing operation can now be carried out.

If it is found after closing the wind protection flap 11 that one of the fibers F, F0 is not located in the correct position, it is possible by operating the appropriate button 19 on the hook part 13 or 130 to decouple the corresponding holding flap 5 or 50 together with the corresponding LID flap 1 or 10, which are associated with the correctly adjusted fiber, from an opening operation. Thus, only the holding flap 50 which is associated with the fiber that has not been adjusted correctly, together with the corresponding LID flap 10, is now opened together with the wind protection flap 11, in order to allow a new fiber to be inserted.

The following flap operations can be carried out using the present device for flap operation.

The flaps 1, 5, 10, 50 are opened automatically by manually raising the wind protection flap 11.

The wind protection flap 11 and the right-hand holding flap 5 (left-hand holding flap 50) are opened by manually operating the left-hand hook part 13 (right-hand hook part 130) and raising the wind protection flap 11.

When the wind protection flap 11 is open, the left-hand LID flap 1 (right-hand LID flap 10) is opened automatically when the left-hand holding flap 5 (right-hand holding flap 50) is opened.

The left-hand and right-hand LID flaps 1 and 10 can be opened manually, separately, when the respective holding flaps 5 and 50 which are associated with them are closed.

The left-hand or right-hand holding flap 5 or 50 can be closed manually when the wind protection flap 11 is open and the LID flaps 1, 10 are open.

The left-hand or right-hand holding flap 5 or 50 is also closed automatically by closing the left-hand or right-hand LID flap 1 or 10 when the wind protection flap 11 is open.

The left-hand and right-hand holding flaps 5 and 50 are closed automatically when the wind protection flap 11 is closed manually.

It should be mentioned that the flaps 1, 5, 10 and 50 are held in exact positions, in a known manner, by magnet devices when they are in their closed states.

It should also be mentioned that, in a simplified form of the present device, there is no need for the driver parts 15, 150, so that there is no coupling between the LID flaps 1, 10 and the associated respective holding flaps 5 and 50.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for flap operation in an optical waveguide splicer, comprising:
   a wind protection flap, adapted to rotate about a first rotation axis between a closed state and an open state;
   a first holding flap, arranged under the wind protection flap and adapted to pivot about a second rotation axis between a closed state and an open state, on one side of a splicing location; and
   a second holding flap, arranged under the wind protection flap and adapted to pivot about the second rotation axis, on the other side of the splicing location, wherein the wind protection flap includes a first coupling device, via which at least one of the first holding flap and the second holding flap are adapted to be coupled to the movement of the wind protection flap from the closed state to the open state.

2. The device as claimed in claim 1, further comprising:
   a first LID flap, arranged such that it is adapted to rotate about a third rotation axis between a closed state and an open state, and arranged on the side of the first holding flap facing away from the splicing location,
   a second LID flap, arranged such that it is adapted to rotate about the third rotation axis between a closed state and an open state, and arranged on the side of the second holding flap facing away from the splicing location,
   a second coupling device, via which the first LID flap is adapted to be coupled to the movement of the first holding flap from the closed state to the open state, and
   a third coupling device, via which the second LID flap is adapted to be coupled to the movement of the second holding flap from the closed state to the open state.

3. The device as claimed in claim 2, wherein the second coupling device is in the form of a driver part whose side which faces the first holding flap engages under the first LID flap in the closed state, and which is integrally formed on the first holding flap.

4. The device as claimed in claim 2, wherein the third coupling device is in the form of a driver part whose side which faces the second holding flap engages under the second LID flap in the closed state, and which is integrally formed on the second holding flap.

5. The device as claimed in claim 2, wherein the first coupling device includes a first hook part and a second hook part, the hook parts being arranged on the wind protection flap, wherein a first latching-in part is arranged on the first holding flap and interacts with the first hook part, wherein a second latching-in part is arranged on the second holding flap and interacts with the second hook part, such that the first hook part latches in on the first latching-in part of the first holding flap, such that it is locked, when the wind protection flap moves from the open state to the closed state, and wherein the second hook part engages on the second latching-in part of the second holding flap such that it is locked, when the wind protection flap moves from the open state to the closed state.

6. The device as claimed in claim 5, wherein the first hook part and the second hook part are adapted to be operated selectively via an operating button, such that they are adapted to be moved from the position in which the first latching-in part and the second latching-in part are locked, to the position in which the first latching-in part and the second latching-in part are released.

7. The device as claimed in claim 6, wherein the second coupling device is in the form of a driver part whose side which faces the first holding flap engages under the first LID flap in the closed state, and which is integrally formed on the first holding flap.

8. The device as claimed in claim 7, wherein the third coupling device is in the form of a driver part whose side which faces the second holding flap engages under the second LID flap in the closed state, and which is integrally formed on the second holding flap.

9. The device as claimed in claim 6, wherein the second coupling device includes a driver part whose side which faces the first holding flap engages under the first LID flap in the closed state, and which is integrally formed on the first holding flap.

10. The device as claimed in claim 7, wherein the third coupling device includes a driver part whose side which faces the second holding flap engages under the second LID flap in the closed state, and which is integrally formed on the second holding flap.

11. The device as claimed in claim 2, wherein the second coupling device is in the form of a driver part whose side which faces the first holding flap engages under the first LID flap in the closed state, and which is integrally formed on the first holding flap.

12. The device as claimed in claim 11, wherein the third coupling device is in the form of a driver part whose side which faces the second holding flap engages under the second LID flap in the closed state, and which is integrally formed on the second holding flap.

13. The device as claimed in claim 2, wherein the second coupling device includes a driver part whose side which faces the first holding flap engages under the first LID flap in the closed state, and which is integrally formed on the first holding flap.

14. The device as claimed in claim 13, wherein the third coupling device includes a driver part whose side which faces the second holding flap engages under the second LID flap in the closed state, and which is integrally formed on the second holding flap.

15. The device as claimed in claim 1, wherein the first coupling device includes a first hook part and a second hook part, the hook parts being arranged on the wind protection flap, wherein a first latching-in part is arranged on the first holding flap and interacts with the first hook part, wherein a second latching-in part is arranged on the second holding flap and interacts with the second hook part, such that the first hook part latches in on the first latching-in part of the first holding flap, such that it is locked, when the wind protection flap moves from the open state to the closed state, and wherein the second hook part engages on the second latching-in part of the second holding flap such that it is locked, when the wind protection flap moves from the open state to the closed state.

16. The device as claimed in claim 15, wherein the first hook part and the second hook part are adapted to be operated selectively via an operating button, such that they are adapted to be moved from the position in which the first latching-in part and the second latching-in part are locked, to the position in which the first latching-in part and the second latching-in part are released.

17. The device as claimed in claim 1, wherein the second rotation axis is arranged underneath the first rotation axis, such that, during the joint movement of the wind protection flap and at least one of the first holding flap and the second holding flap, from the respectively closed states to the respectively open states, a relative movement takes place between the wind protection flap and at least one of the first holding flap and the second holding flap, such that at least one of the first hook part and the second hook part moves from the position in which it is latched on the first latching-in part of at least one of the first holding flap and on the second latching-in part of the second holding flap, to the release position, and including a magnetically acting apparatus, adapted to act between the wind protection flap and at least one of the first holding flap and the second holding flap, in order to couple at least one of the first holding flap and the second holding flap to the movement of the wind protection flap, before at least one of the first hook part moves from the latching-in position on the first latching-in part of the first holding flap and the second hook part moves from the latching-in position on the second latching-in part of the second holding flap.

18. The device as claimed in claim 17, wherein the magnetically acting apparatus is in the form of at least one of a permanent magnet arranged on at least one of the first holding flap and the second holding flap, and a sheet-metal part arranged on at least one of the first holding flap and the second holding flap, wherein at least one of the permanent magnet and sheet-metal part respectively interacts with at least one of a sheet-metal part arranged on the wind protection flap, and a permanent magnet arranged on the wind protection flap, with the sheet-metal part and the permanent magnet being moved toward one another during the movement of the wind protection flap and of at least one of the first holding flap and of the second holding flap from the closed states to the open states, and being moved away from one another during the movement of the wind protection flap and of at least one of the first holding flap and of the second holding flap from the open states to the closed states.

19. The device as claimed in claim 1, wherein the first rotation axis and the second rotation axis are spatially fixed and wherein the splicing location is located between two splicing electrodes.

20. An optical waveguide splicer, comprising:
a device for flap operation, including,
a wind protection flap, adapted to rotate about a first rotation axis between a closed state and an open state;
a first holding flap, arranged under the wind protection flap and adapted to pivot about a second rotation axis between a closed state and an open state, on one side of a splicing location; and
a second holding flap, arranged under the wind protection flap and adapted to pivot about the second rotation axis, on the other side of the splicing location, wherein the wind protection flap includes a first coupling device, via which at least one of the first holding flap and the second holding flap are adapted to be coupled to the movement of the wind protection flap from the closed state to the open state.

* * * * *